UNITED STATES PATENT OFFICE.

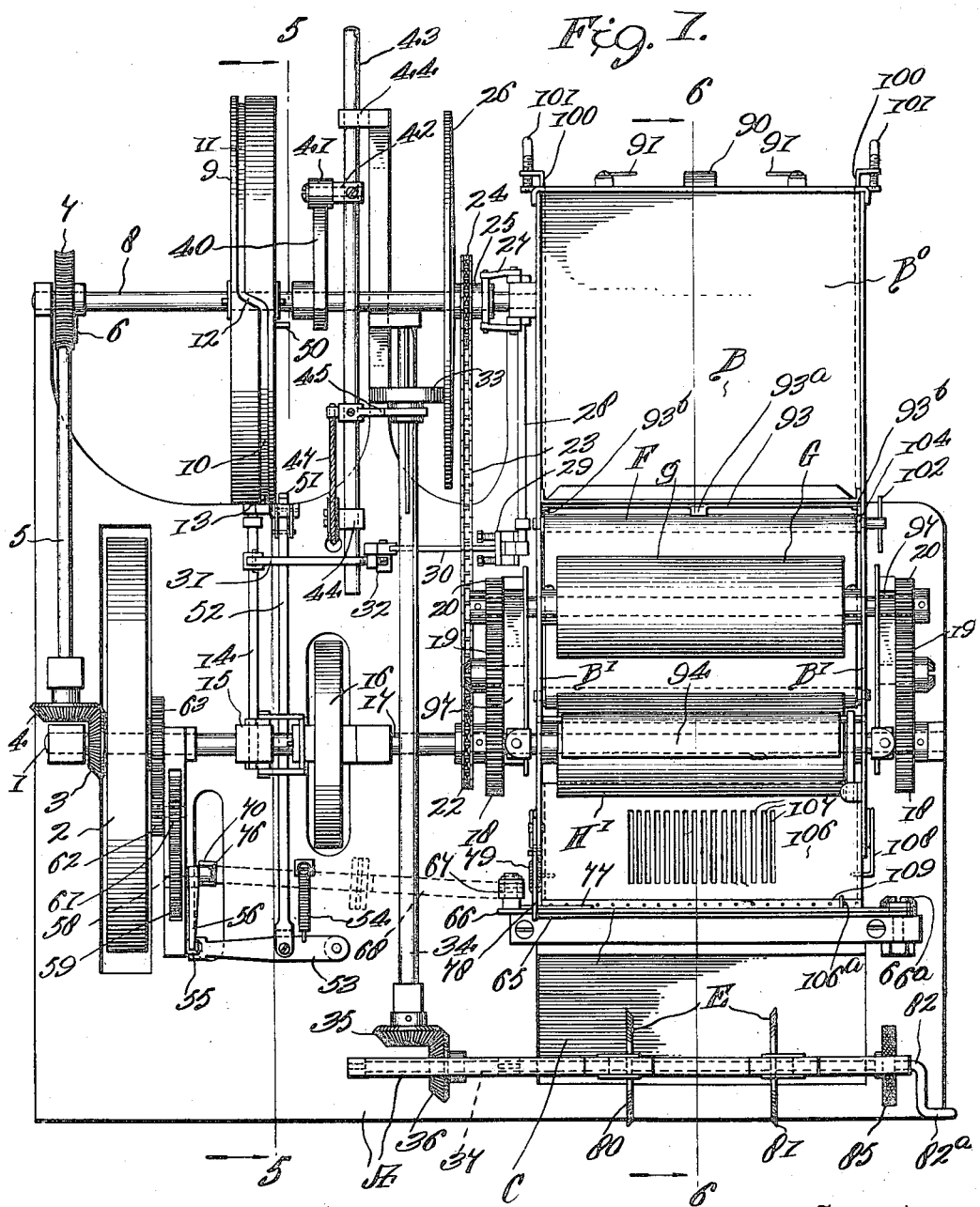

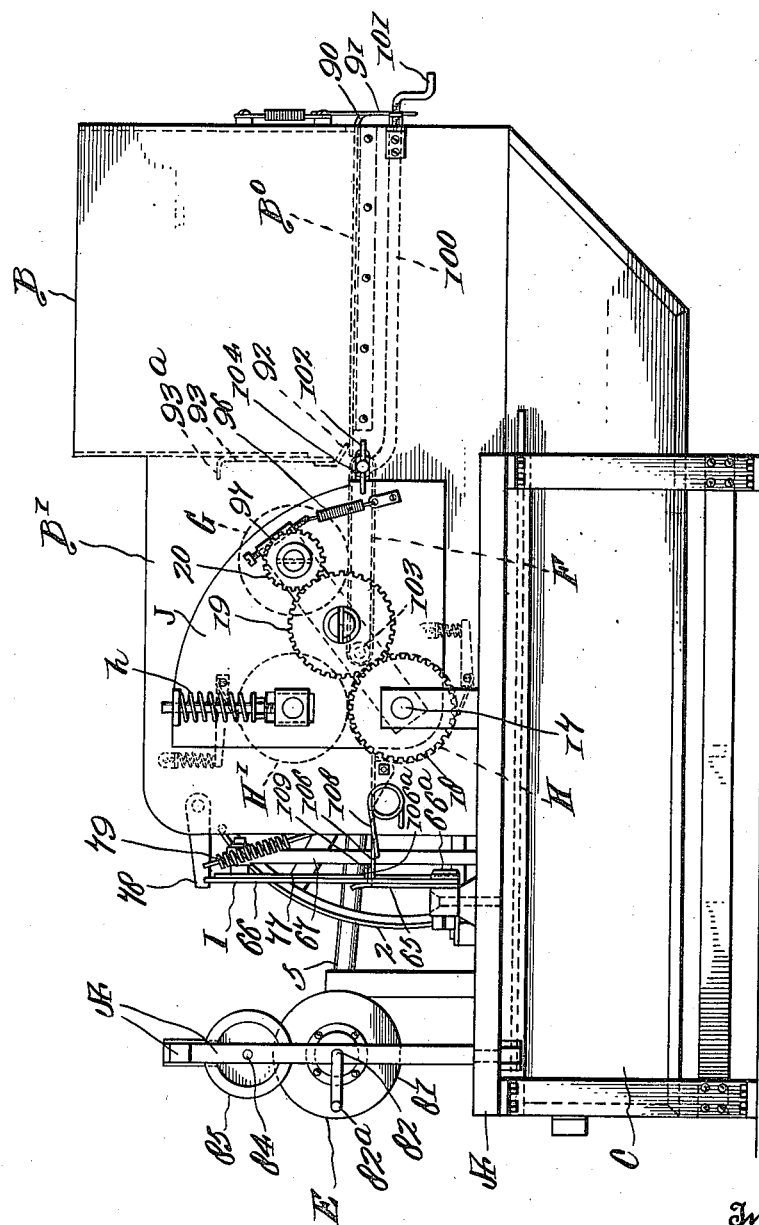

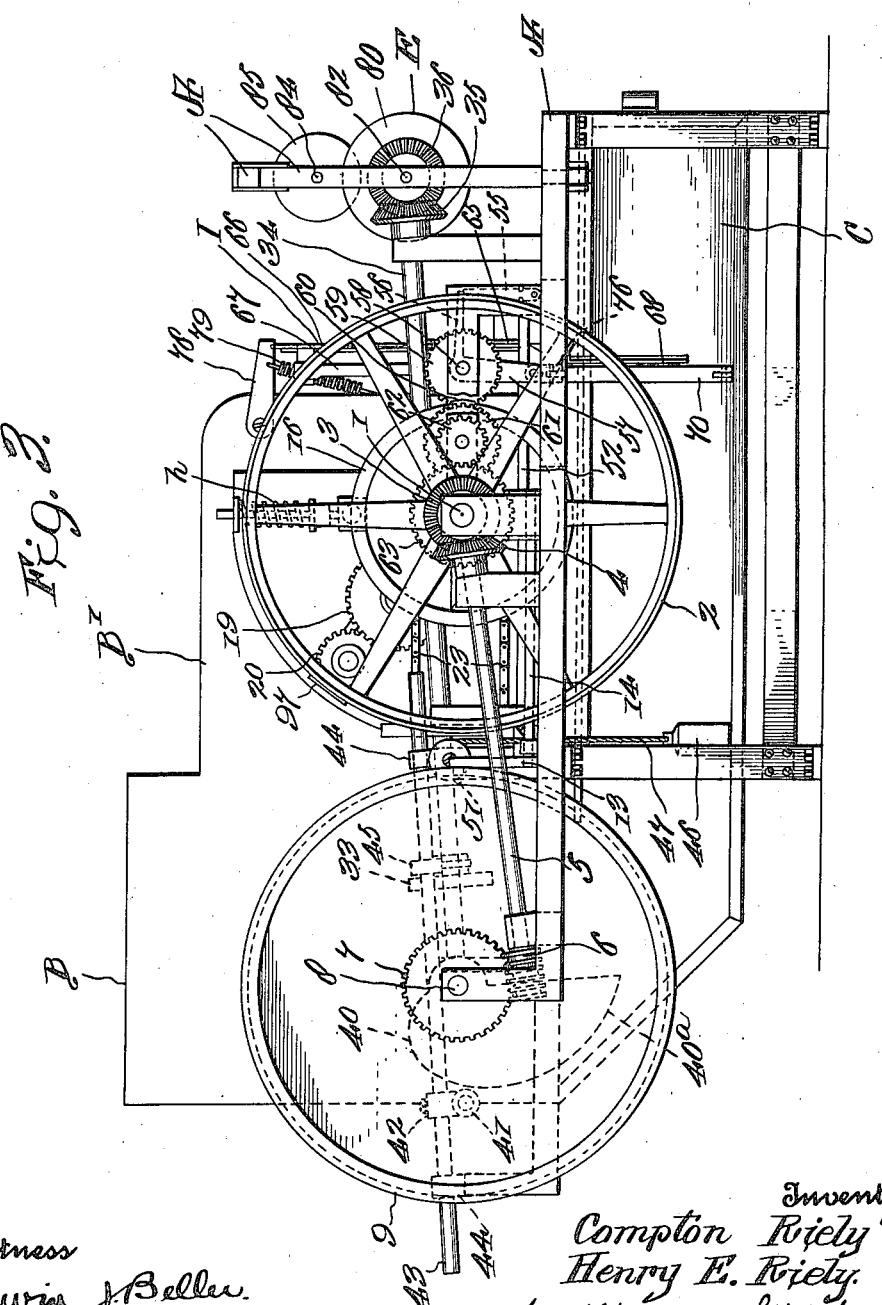

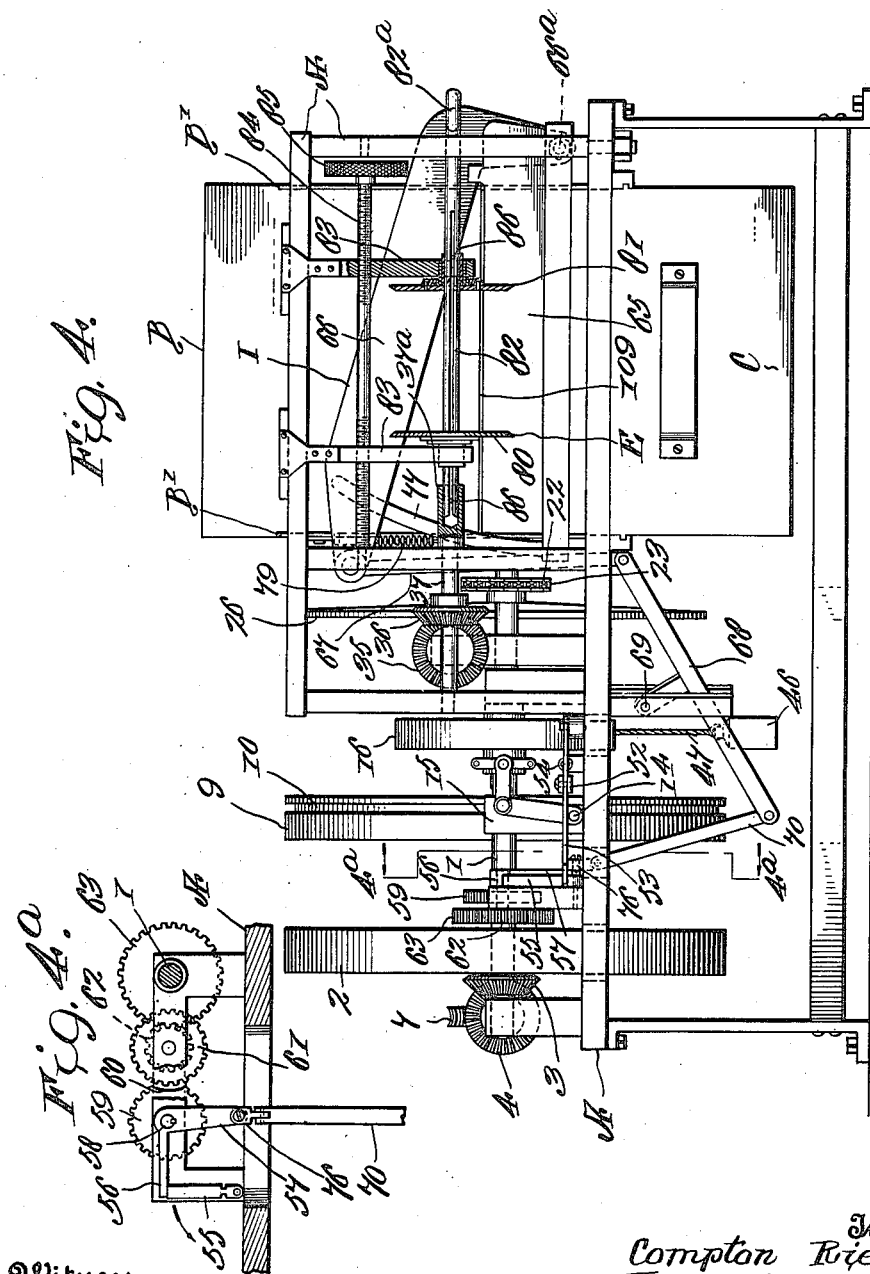

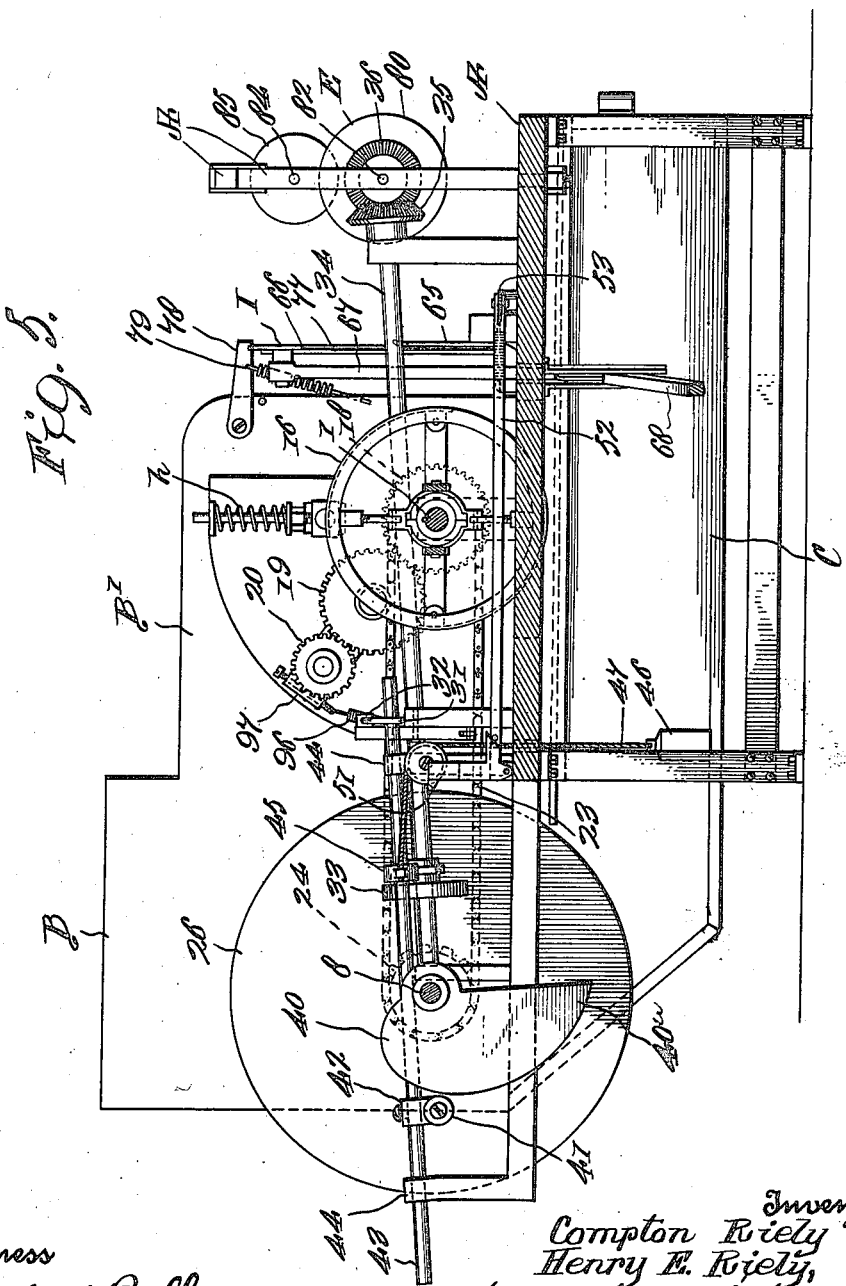

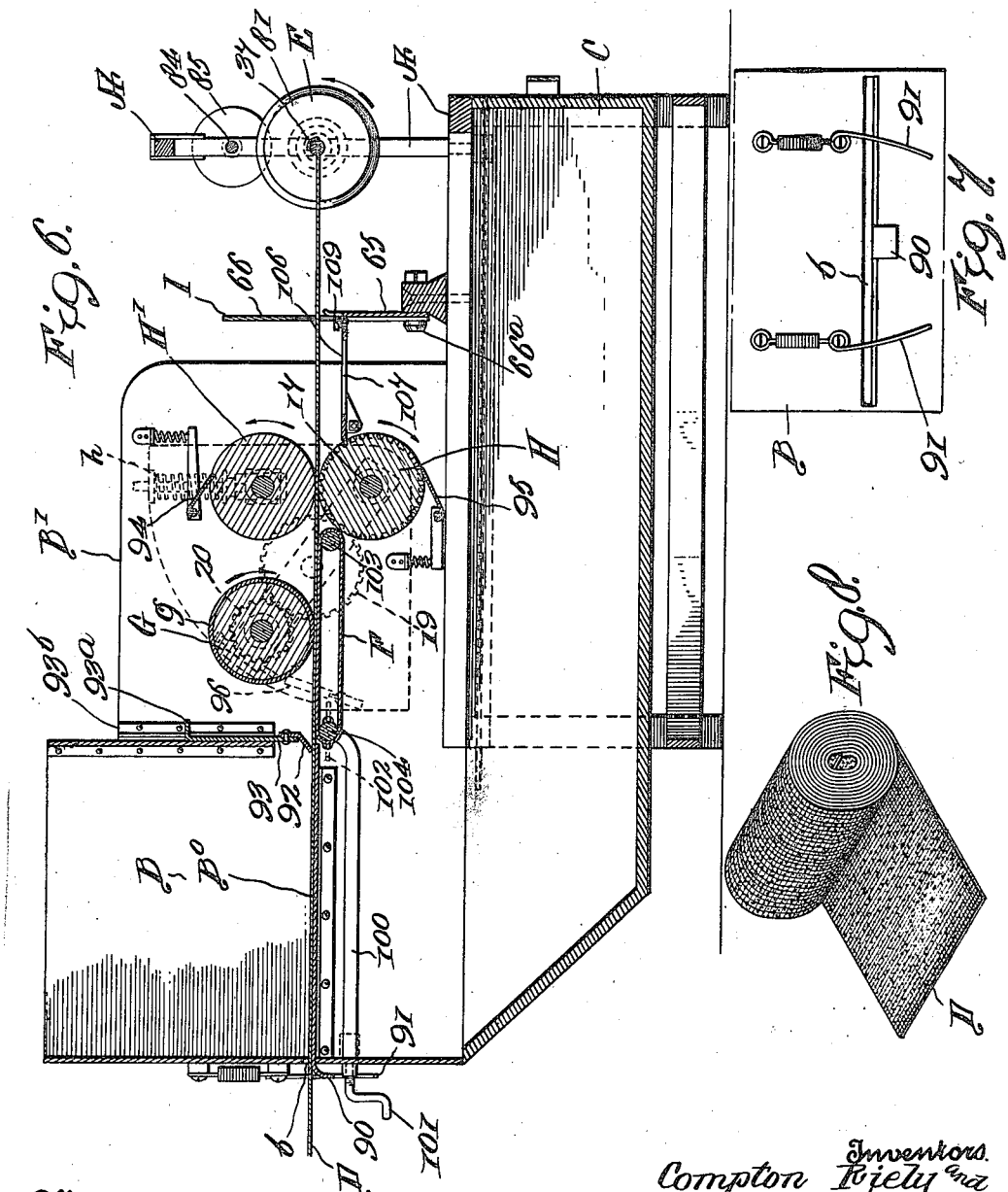

COMPTON RIELY AND HENRY E. RIELY, OF BALTIMORE, MARYLAND.

MACHINE FOR PREPARING SURGICAL BANDAGES.

1,289,912.   Specification of Letters Patent.   Patented Dec. 31, 1918.

Application filed September 10, 1917. Serial No. 190,584.

*To all whom it may concern:*

Be it known that we, COMPTON RIELY and HENRY E. RIELY, citizens of the United States, both residing at Baltimore, in the county of Baltimore and State of Maryland, have invented certain new and useful Improvements in Machines for Preparing Surgical Bandages; and we do hereby declare the following to be a full, clear, and exact description of the invention, such as will enable others skilled in the art to which it appertains to make and use the same.

Our invention relates to improvements in machines for preparing and winding surgical bandages carrying plaster of Paris or other similar composition, and it consists in providing a machine which will draw the crinoline strips beneath the powdered plaster, which will rub the plaster into the crinoline and roll the prepared bandage into a cylindrical roll, with the layers spaced substantially the same distance apart, and will automatically cut off the prepared strip of bandage when the desired length has passed through the machine.

Our invention will be more clearly understood after reference to the accompanying drawings, in which:

Figure 1 is a plan view of the complete machine, the crinoline strip being omitted therefrom;

Fig. 2 is a side elevation of the machine as seen from the right of Fig. 1;

Fig. 3 is a side elevation of the machine as seen from the left of Fig. 1;

Fig. 4 is an end view of the machine as seen from the bottom of Fig. 1, looking toward the top of that figure;

Fig. 4ª shows a section along the line 4ª—4ª of Fig. 4, and looking in the direction of the arrows;

Fig. 5 shows a section along the line 5—5 of Fig. 1, and looking in the direction of the arrows;

Fig. 6 shows a section along the line 6—6 of Fig. 1, and looking in the direction of the arrows;

Fig. 7 is a detail showing the arrangement for keeping the crinoline strip in alinement as it enters the machine, the view being taken from the right of Fig. 2; and Fig. 8 shows the complete finished bandage partly unrolled.

The complete apparatus, except the motive power, is mounted on a suitable frame A, which carries a receiver B in which the plaster powder is placed. Beneath this receiver B is a suitable receptacle, such as a drawer C, which is provided to catch the powder that falls from the bottom of the apparatus. This receiver B is preferably provided with a sliding bottom B° for convenience of dumping same into the drawer C when desired.

The crinoline strip D is connected to the winder E at one end of the machine, and is drawn across the receiver B beneath the superposed mass of plaster powder, whence it passes over the apron F beneath the roller G and then between the feed rollers H and H'; and after passing through the open knife I it is finally wound up on the winder E, the knife being operated automatically to cut the finished bandage into predetermined lengths, as will be hereinafter described.

The various parts operate automatically, as will now be described.

1 represents the main driven shaft carrying the pulley 2, which is driven from any suitable source of power. We have shown a pulley for driving the shaft 1, but any suitable means for continuously driving the shaft 1 may be adopted, if desired.

This shaft 1 is driven continuously, but an intermittent movement is transmitted to the crinoline strip and to the various parts actuating the same, and also to the knife for cutting the strip at predetermined lengths, as well as to the winding apparatus, as will now be described.

The shaft 1 carries a bevel pinion 3 which meshes with the bevel pinion 4 carried by the shaft 5, which shaft 5 carries a worm 6 engaging the worm gear 7 on the shaft 8 which carries the cam wheel 9 rigidly attached thereto, and continuously rotates with the shaft.

This cam wheel 9 has two grooves 10 and 11, connected by the cam groove 12, the whole constituting a continuous groove on the periphery of the cam wheel 9.

Projecting into this continuous groove just referred to, is the pin 13 carried by an arm secured to the rod 14 which operates the clutch member 15 mounted on the shaft 1. This clutch member 15 is thrown into and out of engagement with the clutch member 16, which is fast to the countershaft 17 carrying the feed roller H. This shaft 17 carries gear wheels 18 meshing with the idlers 19 which drive the pinions 20 mounted on the shaft 21 of the rubbing roller G; these pinions 20 being smaller than the gear wheels 18 will rotate at a higher rate of speed than the rollers H and H', pushing backward against the strip as it is fed forward, and will tend to rub the plaster into the crinoline strip which is being fed to the winder between the feeding rollers H and H'. The feed roller H is merely in frictional engagement with the strip above the roller H', and is pressed toward said roller by the springs h, as shown in Fig. 2.

Thus, when the clutch members 15 and 16 are in engagement, the rollers H, H' and G will be continuously driven.

The countershaft 17 carries a sprocket gear 22, engaging the sprocket chain 23 which drives the sprocket wheel 24 on the hub 25 of the friction disk 26, which is loosely mounted on the shaft 8 carrying the cam wheel 9. The hub 25 of this friction disk 26 is moved longitudinally on the shaft 8 by means of the clutch member 27, controlled by the shaft 28 which is rocked by the lever arrangement 29 connected by the rods 30, 31, and the connection 32 to the rod 14, so that when the clutch members 15 and 16 are thrown into engagement the friction disk 26 is moved toward the cam wheel 9. When the disk 26 is moved toward the cam wheel 9, it is caused to engage the friction wheel 33, which is splined on the shaft 34, which shaft carries the bevel gear 35 engaging the bevel gear 36 which rotates the shaft 37 carrying the winder E.

Thus when the clutch members 15 and 16 are in engagement, and the friction disk 26 engages the friction wheel 33, the rollers H and G will be rotated, and the winder will also be turned.

The two grooves 10 and 11 in the cam wheel 9, are so arranged that during half of the revolution of the cam wheel, the parts for feeding the crinoline strip and for winding the same, are in operation, while during the other half of the revolution of the cam wheel these parts are idle; this affords time to remove the finished bandage, and to thread the severed end of the crinoline strip to the winder for a subsequent bandage. The details of shifting the finished bandage from the winder will be hereinafter described. As the bandage is fed to the winder by the feed rollers H and H' at a uniform speed it will be evident that in order to wind said bandage loosely and allow space between the layers of the roll, it will be necessary to impart a higher angular velocity to the winder at the beginning of the operation of winding and to decrease this velocity as the diameter of the spool or roll of the prepared bandage increases. The details of shifting the finished strip from the winder will be hereinafter described.

It will be evident that in winding up the strip on the winder, in order to prevent binding of the strip thereon, it will be necessary to impart a higher rotary velocity to the winder at the start of the operation of the winding, and to decrease this velocity as the spool or roll of the prepared bandage increases in diameter. This is automatically accomplished by a special cam arrangement for moving the friction wheel 33 relative to the axis of the friction disk 26, as will now be described.

Fixed on the shaft 8 is the cam 40, shown most clearly in Figs. 1 and 5, which cam engages a roller 41 carried by an arm 42 secured to the rod 43 sliding in the guides 44, carried by the frame; this rod 43 carries an arm 45 which carries the yoke engaging in the hub of the friction wheel 33, and as this shaft 8 rotates in one direction, this cam 40 moves this friction wheel 33 toward the center of the friction disk 26, thus slowing down the speed of rotation of the spindle 34 and consequently slowing down the rotation of the winder E.

After the point 40ª of the cam has passed clear of the roller 41, which is timed to take place when the winder is thrown out of engagement, the weight 46 will cause the cord 47 to draw the friction wheel 33 back again to the position nearly opposite the periphery of the friction disk 26. This movement of the friction wheel outward will take place at a time when the friction disk is clear of engagement with said friction wheel, and therefore this automatic restoration of the parts to the initial position will not interfere in any way with the operation of either the winding or feeding device.

The bandage is automatically severed near the winder long enough before the pin 13 shifts from the groove 10 to the groove 11, and before the winding and feeding mechanisms are thrown out of gear, leaving a flap to be wound on the winder, and a free end of the severed bandage to be fed to the winder so that it may be threaded therein for a new bandage, when the completed bandage has been removed. This is effected by means of the mechanism which will now be described.

50 represents a pin carried by the cam wheel, which engages the head 51 of a rod 52, which engages the lever 53 and presses the said lever back against the spring 54, see Fig. 1; this lever engages the trigger 55, see Figs. 1, 4 and 4ª, and throws it out in the direction of the arrow indicated in Fig. 4ª, permitting the arm 56 of the bell crank lever 57 to drop slightly; this dropping being positively effected by spring actuated means, as will be hereinafter described.

This bell crank lever 57 is fast on the shaft 58 of the interrupted gear 59, which gear is cut away as at 60, see Fig. 4ª, so as to normally be disengaged from the adjacent gear 61, as shown in Fig. 4ª; but when the arm 56 drops, the teeth of the gear 59 will mesh with the teeth of the gear 61, and the gear 59 will be driven by the pinion 62 engaging the gear 63 on the main shaft 1; and thus the gear wheel 59 will be rotated until the blank space 60 again registers with the teeth of the gear 61.

After the arm 56 makes a complete revolution it will again bring up against the trigger 55, which will be restored to the initial position by means of this spring 54.

The strip is automatically cut off during the revolution of the arm 56, as will now be described.

The knife I consists of two blades, the lower fixed blade 65 and the upper movable blade 66, see Figs. 4 and 6, the upper blade being hinged to the lower at 66ª, and having its opposite end connected by the rod 67 to the walking beam 68, hinged as at 69 to the frame A, and having its opposite end connected by the rod 70 to the bell crank lever 57 by the universal joint 76.

The upper blade of the knife bears against a guide 77, and pressing on top of the upper blade 66 of the knife is the arm 78, pressed down by the spring 79, so that when the trigger 55 is released this spring starts the upper blade of the knife down, causing the rod 67 to rock the walking beams 68, causing the rod 70 to push up slightly on the arm 57 of the bell crank 56; this will throw the teeth on the interrupted gear 59 into engagement with the gear 61, and the upper blade of the knife will be quickly driven by the gear 63 and pinion 62 to the lower or cutting position.

The knife is returned to the initial position by means of the walking beam arrangement, and the train of gearing shown in Figs. 4 and 4ª.

The operation of the knife and the return of the upper blade of the knife to the open position is effected while the strip feeding and winding mechanism is still in operation.

While the feed mechanism and winding mechanism are idle, the finished roll is removed, and the end of the crinoline strip is fed to the winder, as will now be described.

The winder E comprises two heads, 80 and 81, each slidably mounted on the split spindle 82. The heads 80 and 81 are journaled in movable bearings 83 carried by the frame, and may be moved toward or away from each other by means of the right and left hand adjusting screw 84 carrying the milled head 85. In this way the width of the spool may be adjusted to different widths of crinoline strips.

This shaft 82 is provided with a handle 82ª, see Figs. 1 and 4, and may be drawn entirely out of the seat in the two heads 80 and 81, thus permitting the completed roll to drop clear of the winder; and in order to start a new roll the end of the strip is held by one head and fed to the slot, while the shaft 82 is pushed inward into the clutch 37ª in the end of the shaft 37.

Keys 86 project from the clutch 37ª and form the hubs of each of the heads 80 and 81 to engage the slot in the shaft 82, so that these parts may all turn together when the shaft 82 is pushed home.

In order to facilitate feeding the crinoline strip into the slot b of the receiver B, we provide a guide lug 90 with sensitive guide springs 91 on either side thereof, as shown in Fig. 7, so that the strip may be fed straight to the bottom of said box.

To prevent the carrying out of too much plaster powder by the strip, we provide a scraper 92, see Fig. 6, which is preferably attached to a flexible strip 93 of leather, or other suitable material.

This strip is held in place by the guides 93ᵇ and may be adjusted by means of the tab 93ª.

Spring impressed scrapers 94 and 95 are also provided to scrape the adherent plaster off of the feed rollers H and H', see Fig. 6.

The roller H' is pressed toward the feed roller H by means of the springs h, already described, and the roller G is pressed toward the apron F by means of the adjustable spring arrangement 96 shown in Figs. 2, 5 and 6, which draws down the bearing plates 97 in which the train of gears shown in Figs. 1, 2 and 6 are journaled.

These plates 97 swing about the countershaft 17.

The rubber wheel G is preferably provided with a cylindrical shell g of soft rubber, so as to secure greater friction and rub the plaster powder into the strip.

The apron F is preferably made of leather or rubber belting material, and may be tightened by the tighteners 100, which are operated by the hand cranks 101. The apron F may be shifted from time to time, to provide fresh wearing surfaces for the roller G, by means of the hand lever 102 shown in Figs. 2 and 6. This apron F is mounted over the rollers 103 and 104, one of which may be turned by the hand lever 102.

Located between the rollers H and H' and the knife I is the spring plate 106, preferably slotted as at 107, see Fig. 1, to permit the dropping down of any loose powder carried along beneath the strip. This plate is normally held in the raised position shown in Fig. 1, by means of the springs 108, see Figs. 1 and 2, which will normally hold the plate in the closed position, but will permit the same to swing down when struck by the pin 106ª carried by the movable blade 66 of the knife.

This plate 106 has secured to the forward end thereof, a leather strip 109 which fits snugly against the fixed blade of the knife when the latter descends, and thus prevents any crevice between the fixed blade of the knife and the plate; thus when the upper blade of the knife is swung down to the cutting position, it severs the crinoline strip and presses the plate 106 with its leather strip 109 down.

As the knife returns to the initial open position, this plate 106 will flip up the fore end of the severed bandage, causing it to be fed through the opening in the knife, and enabling the operator to grasp the end of the same to thread it to the winder.

The operation of the device is as follows:

Suppose the receiver B to be empty and the parts in the position shown in Fig. 1. Insert the end of the strip in the opening $b$ in the rear of the receiver, as shown in Fig. 6, and slide this free end forward under its rubber roller and between the feed rollers, and through the open knife, until it engages the slot in the shaft 82; the heads 80 and 81 of the spool are adjusted to the proper position by means of the adjusting screw 84. For convenience in threading the new strip of crinoline in the winder the segments J, carrying the bearings of the roller H', are swung to the left about their pivots 17 from the position shown in Fig. 2, thus enabling the strip to be more conveniently fed to the winder. Now place the plaster powder in the receiver B, and connect the driving pulley 2 with the driving mechanism, not shown. The crinoline strip will be fed forward by the feeding rollers H and H', and will be loosely wound upon the winder E. As it passes beyond the scraper 92 the roller G, revolving at a higher rate of speed than the feeding rollers H and H', and in a reverse direction, will tend to knead the plaster powder into the crinoline strip.

After the strip passes beyond the apron F it will be caught by the feed rollers H and H'. The surface of these rollers is kept clean by means of the scrapers 94 and 95, so that they may act smoothly and regularly. After the treated strip has left the feed rollers H and H', the excess of loose powder will fall on the slotted plate 106, and will either pass through the grid therein, or will be dumped into the drawer beneath, when this plate is pressed downward incident to the severing of the strip by the knife.

After the treated strip leaves the feed rollers H and H', it will be loosely wound up on the winder E, and the speed of rotation of the winder will be regulated automatically by the cam 40, whereby the winder will rotate more rapidly in forming the inner layers of the roll, and gradually decrease in speed as the roll nears completion.

Finally, when the bearing face 40ª passes beyond engagement with the roller 41, the winding will be complete, and the knife having previously automatically severed the strip, the finished bandage may then be removed from the machine by simply pulling out the slotted shaft 82.

The winder will be automatically thrown out of operation, as hereinbefore described, by the breaking of the corresponding clutches, and this period of inoperativeness will continue during a half revolution of the cam wheel 9. During this time the shaft 82 is re-inserted, the end of the strip is inserted in the slot in said shaft, the shaft is pushed back in place and the parts are all ready to continue the operation after the cam wheel 9 has completed its half revolution and has once more thrown the clutch members on the shafts 1 and 8.

Thus the machine will operate intermittently; during half of the time the crinoline strip will be fed forward and wound on the winder, and during the other half of the time the completed roll will be removed from the winder and the free end of the strip connected to the winder and ready for winding a fresh bandage, as hereinbefore described.

Besides the adjustment devices already described, means for adjusting the tension of the springs $h$ may be provided, also an adjustable spring tension 96 may be applied to the hinged plates 97 forming the journal bearings for the rollers H and G and the idle gears 19.

Suitable adjusting means may also be provided between the other various parts, such as the arrangement 29 between the parts 28 and 30, but these various adjusting means may be varied to suit varying conditions without departing from the spirit of our invention.

After the powder plaster has been applied to the strip and the rolls formed as hereinbefore described, these rolls are packed away in air-tight containers to be used as desired.

When ready for use, these rolls are taken out, moistened with water and wrapped around the limb or other part being treated, and upon being exposed to the air the wet strip soon sets and forms a cast.

The top of the drawer C is shown as open, so that any powder dropping from the parts above may be accumulated in said drawer and may be returned to the receiver B.

While we have described the strips as made of crinoline, it will be obvious that any other suitable textile or fibrous material may be substituted therefor.

It will be obvious that various modifications might be made in the herein described construction, and in the combination and arrangement of parts, which could be used without departing from the spirit of our invention.

Having thus described our invention, what we claim and desire to secure by Letters Patent of the United States is:

1. A machine for applying powdered material to strips of fibrous material comprising a receptacle adapted to contain the powdered material, a rotary winder, and means independent of said winder for drawing the strip through the powdered material in said receptacle and feeding same to said winder, substantially as described.

2. A machine for applying powdered material to strips of fibrous material comprising a receptacle adapted to contain the powdered material, a rotary winder, and means independent of said winder for drawing the strip through the powdered material in said receptacle and feeding same to said winder, with means located between said receptacle and said winder for kneading said powdered material into said strip, substantially as described.

3. A machine for applying powdered material to strips of fibrous material comprising a receptacle adapted to contain the powdered material, a rotary winder, means independent of said winder for drawing the strip through the powdered material in said receptacle and feeding same to said winder, and automatic means for decreasing the rotary velocity of said winder as the diameter of the roll thereon increases, substantially as described.

4. A machine for applying powdered material to strips of fibrous material comprising a receptacle adapted to contain the powdered material, a rotary winder, means for drawing the strip through the powdered material in said receptacle and feeding same to said winder, with means located between said receptacle and said winder for kneading said powdered material into said strip, and automatic means for decreasing the rotary velocity of said winder as the diameter of the roll thereon increases, substantially as described.

5. A machine for applying powdered material to strips of fibrous material comprising a receptacle adapted to contain the powdered material, a rotary winder, means independent of said winder for drawing the strip through the powdered material in said receptacle and feeding same to said winder, a friction disk, and a friction wheel with gearing driven thereby for rotating said winder, and a cam with means controlled thereby for automatically shifting said friction wheel inwardly on said friction disk as the diameter of the roll on said winder increases, substantially as described.

6. A machine for applying powdered material to strips of fibrous material comprising a receptacle adapted to contain the powdered material, a rotary winder, means independent of said winder for drawing the strip through the powdered material in said receptacle and feeding same to said winder, with means located between said receptacle and said winder for kneading said powdered material into said strip, a friction disk, and a friction wheel with gearing driven thereby for rotating said winder, and a cam with means controlled thereby for automatically shifting said friction wheel inwardly on said friction disk as the diameter of the roll on said winder increases, substantially as described.

7. A machine for applying powdered material to strips of fibrous material comprising a receptacle adapted to contain the powdered material, a rotary winder, means for drawing the strip through the powdered material in said receptacle and feeding same to said winder, with means located between said receptacle and said winder for kneading said powdered material into said strip, a friction disk, and a friction wheel with gearing driven thereby for rotating said winder, a cam with means controlled thereby for automatically shifting said friction wheel inwardly on said friction disk as the diameter of the roll on said winder increases, and a knife adapted to sever the strip, with means for automatically operating said knife when the roll on said winder has attained a predetermined diameter, substantially as described.

8. A machine for applying powdered material to strips of fibrous material comprising a receptacle adapted to contain the powdered material, a rotary winder, means for drawing the strip through the powdered material in said receptacle and feeding same to said winder, with means located between said receptacle and said winder for kneading said powdered material into said strip, a friction disk, a friction wheel with gearing driven thereby for rotating said winder, a cam with means controlled thereby for automatically shifting said friction wheel inwardly on said friction disk as the diameter of the roll on said winder increases, and a knife adapted to sever the strip, with a means for automatically operating said knife when the roll on said winder has attained a predetermined diameter, with means for permitting the removal of the finished roll from the winder, and for attaching the end of the severed strip to said winder when the completed roll has been detached, substantially as described.

9. A machine for applying powdered material to strips of fibrous material comprising a receptacle adapted to contain the powdered material, a rotary winder, means for drawing the strip through the powdered material in said receptacle and feeding same to said winder, with means located between said receptacle and said winder for kneading said powdered material into said strip, a friction disk, a friction wheel with gearing driven thereby for rotating said winder, a cam with means controlled thereby for automatically shifting said friction wheel inwardly on said friction disk as the diameter of the roll on said winder increases, and a knife adapted to sever the strip, with means for automatically operating said knife when the roll on said winder has attained a predetermined diameter, with means for permitting the removal of the finished roll from the winder, and for attaching the end of the severed strip to said winder when the completed roll has been detached, said means comprising a slotted rod detachably connected to and forming the spindle for said winder, substantially as and for the purposes described.

10. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, and means independent of said winder for drawing the strip through the powdered material in said receptacle and feeding same to said winder, with means located between said receptacle and said winder for kneading said powdered material into said strip, substantially as described.

11. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means independent of said winder for drawing the strip through the powdered material in said receptacle and feeding same to said winder, and automatic means for decreasing the rotary velocity of said winder as the diameter of the roll thereon increases, substantially as described.

12. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means independent of said winder for drawing the strip through the powdered material in said receptacle and feeding same to said winder, with means located between said receptacle and said winder for kneading said powdered material into said strip, and automatic means for decreasing the rotary velocity of said winder as the diameter of the roll thereon increases, substantially as described.

13. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means independent of said winder for drawing the strip through the powdered material in said receptacle and feeding same to said winder, a friction disk, and a friction wheel with gearing driven thereby for rotating said winder, and a cam with means controlled thereby for automatically shifting said friction wheel inwardly on said friction disk as the diameter of the roll on said winder increases, substantially as described.

14. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means independent of said winder for drawing the strip through the powdered material in said receptacle and feeding same to said winder, with means located between said receptacle and said winder for kneading said powdered material into said strip, a friction disk, and a friction wheel with gearing driven thereby for rotating said winder, and a cam with means controlled thereby for automatically shifting said friction wheel inwardly on said friction disk as the diameter of the roll on said winder increases, substantially as described.

15. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means for drawing the strip through the powdered material in said receptacle and feeding same to said winder, with means located between said receptacle and said winder for kneading said powdered material into said strip, and a knife adapted to sever the strip, with means for automatically operating said knife when the roll on said winder has attained a predetermined diameter, substantially as described.

16. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means for drawing the strip through the powdered material in said receptacle and feeding same to said winder, automatic means for decreasing the rotary velocity of said winder as the diameter of the roll thereon increases, and a knife adapted to sever the strip, with means for automatically operating said knife when the roll on said winder has attained a predetermined diameter, substantially as described.

17. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means for drawing the strip through the powdered material in said receptacle and feeding same to said winder, with means located between said receptacle and said winder for kneading said powdered material into said strip, automatic means for decreasing the rotary velocity of said winder as the diameter of the roll thereon increases, and a knife adapted to sever the strip, with means for automatically operating said knife when the roll on said winder has attained a predetermined diameter, substantially as described.

18. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means for drawing the strip through the powdered material in said receptacle and feeding same to said winder, a friction disk, a friction wheel with gearing driven thereby for rotating said winder, a cam with means controlled thereby for automatically shifting said friction wheel inwardly on said friction disk as the diameter of the roll on said winder increases, and a knife adapted to sever the strip, with means for automatically operating said knife when the roll on said winder has attained a predetermined diameter, substantially as described.

19. A machine for applying powdered material to strips of fibrous material comprising a receptacle adapted to contain the powdered material, a rotary winder provided with a slotted spindle detachably connected thereto, for connecting said strip to said winder and releasing the finished roll therefrom, means for drawing the strip through the powdered material in said receptacle and feeding same to said winder, with means located between said receptacle and said winder for kneading said powdered material into said strip, a friction disk, a friction wheel with gearing driven thereby for rotating said winder, a cam with means controlled thereby for automatically shifting said friction wheel inwardly on said friction disk as the diameter of the roll on said winder increases, and a knife adapted to sever the strip, with means for automatically operating said knife when the roll on said winder has attained a predetermined diameter, substantially as described.

20. In a machine for applying powdered material to strips of fibrous material, the combination with a source of power and a main shaft driven thereby, of a rotary winder to receive said strip, means for supplying powdered material to said strip, means operated by said main shaft for feeding said strip to said winder and for kneading the powdered material into said strip, means operated by said main shaft for automatically slowing down the rotary speed of the winder as the diameter of the roll thereon increases, a spring impressed knife for cutting said strip, and means automatically operated by said main shaft for releasing said knife, and for restoring the same to the initial position, substantially as described.

21. In a machine for applying powdered material to strips of fibrous material, the combination with a source of power and a main shaft driven thereby, of a rotary winder to receive said strip, means for supplying powdered material to said strip, means independent of said winder and operated by said main shaft for feeding said strip to said winder and for kneading the powdered material into said strip, and means operated by said main shaft for automatically slowing down the rotary speed of the winder as the diameter of the roll thereon increases, comprising a friction disk, and a friction wheel with gearing driven thereby for rotating said winder, and a cam with means controlled thereby for automatically shifting said friction wheel inwardly on said friction disk as the diameter of the roll on said winder increases, substantially as described.

22. In a machine for applying powdered material to strips of fibrous material, the combination with a source of power and a main shaft driven thereby, of a rotary winder to receive said strip, means for supplying powdered material to said strip, means independent of said winder and operated by said main shaft for feeding said strip to said winder and for kneading the powdered material into said strip, means operated by said main shaft for automatically slowing down the rotary speed of the winder as the diameter of the roll thereon increases, comprising a friction disk, and a friction wheel with gearing driven thereby for rotating said winder, and a cam with means controlled thereby for automatically shifting said friction wheel inwardly on said friction disk as the diameter of the roll on said winder increases, substantially as described.

23. In a machine for applying powdered material to strips of fibrous material, the combination with a source of power and a main shaft driven thereby, of a rotary winder to receive said strip, means for supplying powdered material to said strip, feed rollers operated by said main shaft and independent of said winder for feeding said strip to said winder, a kneading roller also operated by said main shaft and driven at a higher rate of speed than said feed rollers, for kneading the powdered material into said strip, and means operated by said main shaft for automatically slowing down the rotary speed of the winder as the diameter of the roll thereon increases, substantially as described.

24. In a machine for applying powdered material to strips of fibrous material, the combination with a source of power and a main shaft driven thereby, of a rotary winder to receive said strip, means for supplying powdered material to said strip, feed rollers operated by said main shaft for feeding said strip to said winder, a kneading roller also operated by said main shaft and driven at a higher rate of speed than said feed rollers, for kneading the powdered material into said strip, an endless apron adjustably mounted beneath said kneading roller and supporting said strip while it is engaged by said kneading roller, and means operated by said main shaft for automatically slowing down the rotary speed of the winder as the diameter of the roll thereon increases, substantially as described.

25. In a machine for applying powdered material to strips of fibrous material, the combination wtih a source of power and a main shaft driven thereby, a rotary winder to receive said strip, means for supplying powdered material to said strip, means intermittently operated by said main shaft for feeding said strip to said winder and for kneading the powdered material into said strip, means simultaneously operated by said main shaft for automatically slowing down the rotary speed of the winder as the diameter of the roll thereon increases, a knife for cutting said strip, and means automatically operated by said main shaft for releasing said knife, before the feed mechanism ceases to operate, with means for restoring the same to the initial position, substantially as described.

26. In a machine for applying powdered material to strips of fibrous material, the combination with a source of power and a main shaft driven thereby, of a rotary winder to receive said strip, means for supplying powdered material to said strip, means intermittently operated by said main shaft for feeding said strip to said winder and for kneading the powdered material into said strip, means simultaneously operated by said main shaft for automatically slowing down the rotary speed of the winder as the diameter of the roll thereon increases, and means operated by said main shaft for severing said strip when the roll has been completed, substantially as described.

27. In a machine for applying powdered material to strips of fibrous material, the combination with a source of power and a main shaft driven thereby, of a rotary winder to receive said strip, means for supplying powdered material to said strip, means intermittently operated by said main shaft for feeding said strip to said winder, means simultaneously operated by said main shaft for automatically slowing down the rotary speed of the winder as the diameter of the roll thereon increases, and means operated by said main shaft for severing said strip when the roll has been completed, substantially as described.

28. In a machine for applying powdered material to strips of fibrous material, the combination with a source of power and a main shaft driven thereby, of a rotary winder to receive said strip, means for supplying powdered material to said strip, means independent of said winder and intermittently operated by said main shaft for feeding said strip to said winder, and means simultaneously operated by said main shaft for automatically slowing down the rotary speed of the winder as the diameter of the roll thereon increases, substantially as described.

29. In a machine for applying powdered material to strips of fibrous material, the combination with a source of power and a main shaft driven thereby, of a rotary winder to receive said strip, means for supplying powdered material to said strip, feed rollers operated by said main shaft for feeding said strip to said winder, an endless apron located in front of said feed rollers and supporting said strip and a kneading roller located above said belt and also operated by said main shaft and driven at a higher rate of speed than said feed rollers, for kneading the powdered material into said strip, substantially as described.

30. In a machine for applying powdered material to strips of fibrous material, the combination with a source of power and a main shaft driven thereby, of a rotary winder to receive said strip, means for supplying powdered material to said strip, feed rollers operated by said main shaft for feeding said strip to said winder, and a kneading roller also operated by said main shaft and driven at a higher rate of speed than said feed rollers, for kneading the powdered material into said strip, with an endless apron adjustably mounted beneath said kneading roller and supporting said strip while it is engaged by said kneading roller, substantially as described.

31. In a machine for applying powdered material to strips of fibrous material, the combination with a source of power and a main shaft driven thereby of a rotary winder to receive said strip, means for supplying the desired material to said strip, means independent of said winder and operated by said main shaft for feeding said strip to said winder, and means operated by said main shaft for automatically slowing down the rotary speed of the winder as the diameter of the roll thereon increases, comprising a friction disk, and a friction wheel with gearing driven thereby for rotating said winder, and a cam with means controlled thereby for automatically shifting said friction wheel inwardly on said friction disk as the diameter of the roll on said winder increases, substantially as described.

32. In a machine for applying powdered material to strips of fibrous material, the combination with a source of power and a main shaft driven thereby, of a rotary winder to receive said strip, means for supplying the desired material to said strip, means operated by said main shaft for feeding said strip to said winder, and means operated by said shaft for automatically slowing down the rotary speed of the winder as the diameter of the roll thereon increases, comprising a friction disk, and a friction wheel with gearing driven thereby for rotating said winder, and a cam with means controlled thereby for automatically shifting said friction wheel inwardly on said friction disk as the diameter of the roll on said winder increases, with means controlled by the main shaft for periodically severing said strip near said winder, substantially as described.

33. In a machine for applying powdered material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder controlled by said cam wheel, simultaneously operated means also controlled by said cam wheel for automatically slowing down the rotary speed of the winder as the diameter of the roll thereon increases, a knife for cutting said strip, means controlled by said cam wheel for releasing said knife, and mechanism operated by said main shaft for restoring said knife to the initial position, substantially as described.

34. In a machine for applying powdered material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder and for kneading the material into said strip controlled by said cam wheel, simultaneously operated means also controlled by said cam wheel for automatically slowing down the rotary speed of the winder as the diameter of the roll thereon increases, a knife for cutting said strip, means controlled by said cam wheel for releasing said knife, and mechanism operated by said main shaft for restoring said knife to the initial position, substantially as described.

35. In a machine for applying powdered material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder controlled by said cam wheel, and simultaneously operated means also controlled by said cam wheel for automatically slowing down the rotary speed of the winder as the diameter of the roll thereon increases, substantially as described.

36. In a machine for applying powdered material to strips of fibrous material, the combination with a source of power and a main shaft driven thereby, of a rotary winder to receive said strip, a split rod detachably connected to and forming the spindle for said winder and serving as a means for fastening the end of the strip to said winder and as a core to the roll wound thereon, means for supplying the desired material to said strip, a cam wheel, and gearing for driving same operated by said main shaft, means for intermittently feeding said strip to said winder controlled by said cam wheel, and simultaneously operated means also controlled by said cam wheel for automatically slowing down the rotary speed of the winder as the diameter of the roll thereon increases, substantially as described.

37. In a machine for applying finely divided material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder controlled by said cam wheel, and simultaneously operated means also controlled by said cam wheel for automatically slowing down the rotary speed of the winder as the diameter of the roll thereon increases, with means also controlled by said cam wheel for automatically starting and stopping said winder, substantially as described.

38. In a machine for applying finely divided material to strips of fibrous material, the combination with a source of power and a main shaft driven thereby, of a rotary winder to receive said strip, means for supplying the desired material to said strip, a cam wheel, and gearing for driving same operated by said main shaft, means for feeding said strip intermittently to said winder controlled by said cam wheel, said means comprising feed rollers and gearing for driving same, a countershaft for driving said gearing, and clutch mechanism for connecting said countershaft to said main shaft, said clutch mechanism being controlled by said cam wheel and simultaneously operated means also controlled by said cam wheel for automatically slowing down the rotary speed of the winder as the diameter of the roll thereon increases, with means automatically controlled by said cam wheel for starting and stopping said winder, substantially as described.

39. In a machine for applying finely divided material to strips of fibrous material, the combination with a source of power and a main shaft driven thereby, of a rotary winder to receive said strip, means for supplying the desired material to said strip, a cam wheel, and gearing for driving same operated by said main shaft, means for feeding said strip intermittently to said winder controlled by said cam wheel, said means comprising feed rollers and gearing for driving same, a countershaft for driving said gearing, and clutch mechanism for connecting said countershaft to said main shaft, said clutch mechanism being controlled by said cam wheel and simultaneously operated means also controlled by said cam wheel for automatically slowing down the rotary speed of the winder as the diameter of the roll thereon increases, with means also controlled by said cam wheel for automatically starting and stopping said winder, substantially as described.

40. In a machine for applying finely divided material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder controlled by said cam wheel, and simultaneously operated means also controlled by said cam wheel for automatically slowing down the rotary speed of the winder as the diameter of the roll thereon increases, said means comprising a second cam on the same shaft with said cam wheel, a friction disk loosely mounted on said cam wheel shaft, a friction wheel adapted to intermittently engage said friction disk, gearing driven by said friction wheel for rotating said winder, means controlled by said second cam for moving said friction wheel radially relative to said friction disk, and means controlled by said cam wheel for imparting intermittent motion to said friction disk, with means also controlled by said cam wheel for automatically starting and stopping said winder, substantially as described.

41. In a machine for applying finely divided material to strips of fibrous material, the combination with a source of power and a main shaft driven thereby, of a rotary winder to receive said strip, means for supplying the desired material to said strip, a cam wheel, and gearing for driving same operated by said main shaft, means for intermittently feeding said strip to said winder controlled by said cam wheel, and simultaneously operated means also controlled by said cam wheel for automatically slowing down the rotary speed of the winder as the diameter of the roll thereon increases, said means comprising a second cam on the same shaft with said cam wheel, a friction disk loosely mounted on said cam wheel shaft, a friction wheel adapted to intermittently engage said friction disk, gearing driven by said friction wheel for rotating said winder, means controlled by said second cam for moving said friction wheel radially relative to said friction disk, and means controlled by said cam wheel for imparting intermittent motion to said friction disk, a knife for cutting said strip, means operated by said cam wheel for releasing said knife, and mechanism operated by said main shaft for restoring said knife to the initial position, substantially as described.

In testimony whereof, we affix our signatures.

COMPTON RIELY.
HENRY E. RIELY.